March 11, 1969 E. R. BRUNNER 3,432,720
TELEVISION DEFLECTION CIRCUIT WITH LINEARITY CORRECTION FEEDBACK
Filed Jan. 18, 1967
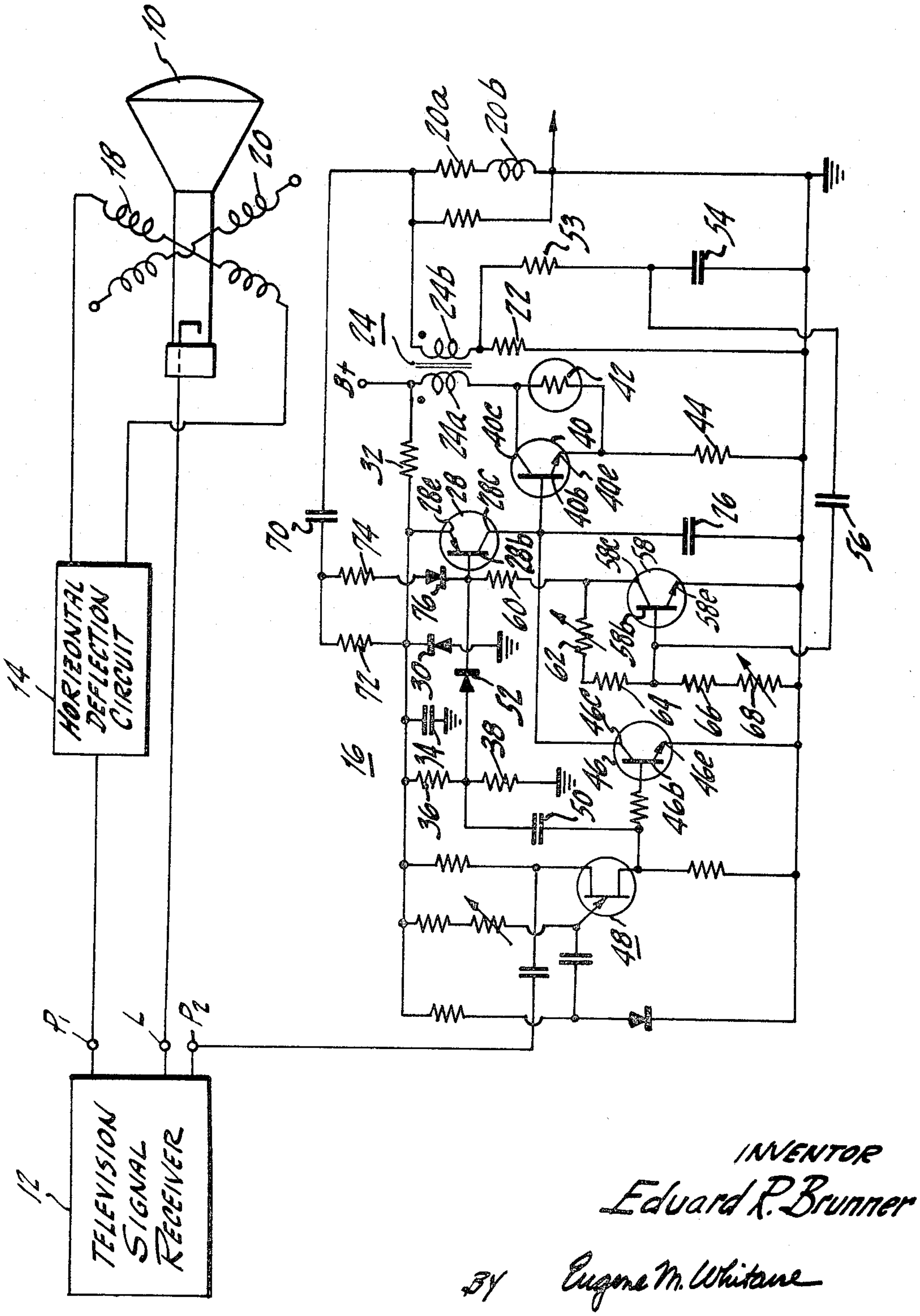
INVENTOR
Eduard R. Brunner
BY Eugene M. Whitacre
ATTORNEY

United States Patent Office 3,432,720

Patented Mar. 11, 1969

3,432,720

TELEVISION DEFLECTION CIRCUIT WITH LINEARITY CORRECTION FEEDBACK

Eduard R. Brunner, Zurich, Switzerland, assignor to Radio Corporation of America, a corporation of Delaware Filed Jan. 18, 1967, Ser. No. 610,118
Claims priority, application Great Britain, Feb. 1, 1966, 4,386/66
U.S. Cl. 315—27 11 Claims
Int. Cl. H01j *29/70, 29/74*

ABSTRACT OF THE DISCLOSURE

A deflection circuit wherein a capacitor is periodically charged by means of a transistor current source and discharged by a parallel switching means. A linearity correcting R-C feedback network having a time constant substantially equal to that of the deflection windings is coupled to the current source. A further S-shaping feedback network is also coupled to the current source.

A sawtooth waveform generating circuit adapted for television vertical deflection. A transistor constant current source charges a capacitor. Feedback is provided to the transistor constant current source to correct for circuit component nonlinearities and to provide S-shaping of the deflection current.

This invention relates to electromagnetic cathode ray beam deflection circuits of the type employed in television receivers and, in particular, to transistor vertical deflection circuits including apparatus for substantially improving the vertical linearity of the scanning raster produced on an associated cathode ray tube.

One type of vertical deflection circuit utilizes a current source for charging a capacitor to produce a sawtooth voltage across such capacitor. The voltage produced across the capacitor is applied to an amplifier to generate a substantially sawtooth shaped current for application to vertical deflection windings associated with a cathode ray tube. The electron beam of the cathode ray tube is thereby periodically deflected in the vertical direction. A switching device coupled across the capacitor is utilized to discharge the capacitor at a predetermined time in the deflection cycle to return the electron beam to its initial position to prepare for the next deflection cycle. The deflection cycles are synchronized by means of vertical synchronizing signals transmitted to the television receiver along with the image-representative video signal information.

In such circuits, linearity of the scanning raster is dependent upon the degree to which the capacitor charging current is maintained constant and, furthermore, to the degree to which parameters of the active devices (amplifiers) and other circuit components between the capacitor and deflection windings remain at their nominal values throughout the range of operational current and voltage limits and as operating conditions such as ambient temperature and line voltage vary. Furthermore, where the deflection circuit is utilized in connection with a cathode ray tube requiring a relatively large beam deflection angle (e.g. 114°), "S-shaping" of the vertical deflection waveform is required to produce a linear vertical raster.

In accordance with the present invention, the desired linearity of the scanning raster in the vertical direction is achieved by coupling the sawtooth capacitor to a transistor which is arranged to provide a substantially constant current as the capacitor voltage increases. In accordance with a further feature of the present invention, a feedback network having a time constant substantially the same as the time constant of the deflection windings is coupled between such deflection windings and the input circuit of the constant current producing transistor to modify the constant current so as to compensate for nonlinearities in components between the deflection windings and sawtooth capacitor and thereby provide the desired scanning linearity. In accordance with still another feature of the present invention, further compensating means are provided in an "S-shaping" feedback circuit coupled to the input of the constant current source transistor to compensate for the change with deflection angle of the distance from the beam deflection center to the face of the cathode ray tube.

The novel features that are considered characteristic of this invention are set forth with particularity in the appended claims. The invention itself, however, both as to its organization and method of operation as well as additional objects thereof, will best be understood from the following description when read in connection with the accompanying drawing.

In the drawing, the bulk of the circuits of a television receiver serving to provide signals for energizing an image reproducing device such as a kinescope 10 are represented by a single block 12 labelled, "Television Signal Receiver." The receiver unit 12 incorporates the usual elements required to provide video signals at output terminal L for appropriate intensity modulation of the electron beam of kinescope 10, as well as to provide suitable synchronizing pulse information at terminals $P_1$ and $P_2$ to synchronize, in respective horizontal and vertical deflection circuits 14 and 16, the energization of the respective horizontal and vertical windings 18 and 20 of a deflection yoke associated with kinescope 10.

In the vertical deflection arrangement shown in the drawing, a sawtooth current waveform is caused to pass through the vertical deflection windings 20 of the deflection yoke, the windings 20 being represented by their equivalent resistance **20*a* and inductance 20*b* in the circuit schematic diagram. The windings 20 are coupled across the series combination of a resistor 22 and the secondary winding 24*b* of a vertical deflection output transformer 24. The flow of the desired sawtooth current waveform in the windings 20, which appear essentially resistive during the relatively low frequency trace portion of the television vertical deflection cycle, is produced in response to the development during trace of a sawtooth voltage waveform across the primary winding 24*a* of output transformer 24. During the relatively rapid (higher frequency) retrace portion of the vertical deflection cycle, the deflection windings 20 are substantially inductive and the retrace voltage waveform across windings 20 during that interval is a relatively steeply rising pulse. Development of the composite recurring pulse-sawtooth voltage waveform across transformer 24 is accomplished in the illustrated embodiment of the invention by alternately charging and discharging the capacitor 26 to produce the desired recurring sawtooth waveform. Charging of capacitor 26 occurs during trace via a path comprising transistor 28 to which there is coupled a substantially constant voltage supply comprising Zener diode 30, a resistor 32 coupled to the main B+ voltage supply and a filter capacitor 34 coupled across diode 30. The substantially constant voltage developed across Zener diode 30 is applied to the emitter electrode 28*e* of transistor 28 and a portion of that constant voltage is applied by means of the resistive voltage divider comprising resistors 36 and 38 to one electrode of a diode 52, the other electrode of which is coupled to the base electrode 28*b* of transistor 28. The collector electrode 28*c* of transistor 28 is coupled to capacitor 26 so as to supply the emitter-collector current of transistor 28 to capacitor 26. A sawtooth voltage waveform is produced across capacitor 26 and is applied via amplifier transistor 40 to the primary winding 24*a* of output transformer 24. A voltage dependent resistor (VDR) 42 is coupled across the output terminals (collector-emitter) of amplifier transistor 40 and an emitter biasing resistor 44 is coupled between the emitter electrode 40***e* of transistor 40 and a point of reference voltage (e.g. ground).

Discharging of capacitor 26 is accomplished during retrace by means of a switching transistor 46, of which the collector electrode 46*c* and emitter electrode 46*e* are coupled across capacitor 26. Switching transistor 46 is rendered conductive during the retrace portion of each vertical deflection cycle by means of pulses supplied to the base electrode 46*b* from a unijunction transistor oscillator 48. The pulse output of oscillator 48 is also applied via capacitor 50 and blocking diode 52 to the base electrode 28*b* of transistor 28. The operation of oscillator 48 is synchronized with respect to the image-representative portions of the received television signal by means of vertical synchronizing pulses supplied thereto via terminal $P_2$.

In accordance with one aspect of the present invention, S-shaping means are coupled to the input (base electrode 28*b*) of transistor 28. The S-shaping means comprises an integrating network including a resistor 53 and a capacitor 54 coupled across resistor 22. The integrated sample of output voltage is coupled from the junction of resistor 53 and capacitor 54 via a capacitor 56 to the input (base electrode 58*b*) of a transistor 58. The series path comprising collector electrode 58*c* and emitter electrode 58*e* of transistor 58 is coupled by means of a resistor 60 to the input (base electrode 28*b*) of transistor 28 to provide the necessary correction to the otherwise substantially constant input current applied to transistor 28. A biasing network comprising resistors 62, 64, 66 and 68 is associated with transistor 58, the junction of resistor 64 and 66 being coupled to the base electrode 58*b*. Resistor 68 preferably is a temperature sensitive resistor selected to compensate the operation of transistor 58 for changes in ambient operating temperature.

In accordance with a further aspect of the present invention, a linearity correcting feedback network comprising a capacitor 70 and a resistor 72 is coupled between deflection winding 20 and a point of reference voltage (e.g. the Zener diode 30). The junction of capacitor 70 and resistor 72 is coupled by means of a resistor 74 and a blocking diode 76 to the base electrode 28*b* of transistor 28. The time constant of capacitor 70 and resistor 72 is selected substantially equal to the time constant of deflection windings 20 as determined by the equivalent resistance 20*a* and equivalent inductance 20*b*.

The operation of the vertical deflection circuit now will be described. Switching stage 46 is operated on a recurrent basis alternately to permit charging of capacitor 26 by the current supply transistor 28 and then to disconnect such supply and effect discharging of capacitor 26.

During the trace portion of each vertical deflection cycle, oscillator stage 48 and switching transistor 46 have no effect on the operation of the deflection waveform generating circuit. A charging circuit for capacitor 26 is established from the substantially constant voltage supply provided by Zener diode 30 via the emitter 28*e*-collector 28*c* path of charging transistor 28. Transistor 28 is arranged, by virtue of the substantially constant current into the base electrode 28*b*, to provide a substantially constant current to charge capacitor 26 in a linear fashion. A substantially linear voltage waveform is produced across capacitor 26 and is amplified by transistor 40. The output waveform produced by transistor 40 across transformer 24 is applied to the deflection windings 20 to provide the desired deflection current waveform.

As is well-known, if a linear deflection current is provided to deflection windings 20, the voltage across the inductive component 20*b* during trace will be substantially constant. Any deviation from this constant voltage is representative of a deviation of the current from a linear waveform. The differentiating circuit 70, 72 provides across resistor 72 a voltage which is indicative of any variation from the aforementioned constant voltage across and linearly varying current in inductive component 20*b*. A correction current is applied via resistor 74 and diode 76 to base electrode 28*b* in a direction to compensate for the undesired deviation. The values of the components in the correction circuit described above are selected with a time constant substantially equal to that of deflection windings 20 so as to accurately reproduce the undesired variations. Furthermore, those components are selected to have sufficiently high impedances so as not to noticeably load the deflection winding circuit.

In order to compensate for the variation in the distance between deflection center of the electron beam and the phosphor screen in the kinescope 10 as the corners of such screen are scanned, S-shaping of the otherwise linear deflection current waveform is provided. Specifically, a sawtooth voltage is produced across the relatively small-valued resistor 22 coupled in series with secondary winding 24*b*. The sawtooth voltage is integrated by means of resistor 53 and capacitor 54. The resultant parabolic waveform is applied via capacitor 56 to base electrode 58*b* of transistor 58 to modify the input current to transistor 28 so as to produce the desired S-shaping of the current supplied to windings 20.

At the end of the trace portion of each vertical deflection cycle, a negative polarity vertical synchronizing pulse is applied from terminal $P_2$ to oscillator 48 to turn the unijunction transistor 48 "on." A positive pulse is then supplied to the switching transistor 46 to turn it "on" and, at the same time, the pulse is applied via capacitor 50 and diode 52 to base electrode 28*b* to turn transistor 28 "off." Capacitor 26 discharges rapidly through transistor 46 while the current in deflection windings 20 reverses. VDR 42 is coupled across transistor 40 to protect that transistor against excessive reverse voltages which might otherwise appear across the collector-emitter electrodes thereof during retrace.

At the end of retrace, the oscillator 48 and therefore switching transistor 46 cease conduction while transistor 28 recommences conduction to initiate the succeeding trace interval.

While a unijunction transistor oscillator is shown in the drawing, other suitable circuits (e.g. a blocking oscillator) may be utilized for maintaining the operation of the deflection waveform generating circuit in synchronism with the transmitted vertical synchronizing pulses.

What is claimed is:

1. In a television receiver, a deflection circuit comprising a first capacitor, first transistor means coupled to said first capacitor to provide a substantially constant charging current to said capacitor to produce a substantially linearly varying voltage, amplifying means coupled to said capacitor for amplifying said linearly varying voltage, deflection windings coupled to said amplifying means, and feedback means connected between said deflection windings and the input of said first transistor means to compensate said charging current for circuit nonlinearities between said capacitor and said deflection windings, said feedback means comprising the combination of second capacitor and a first resistor, said combination having a time constant substantially equal to that of said deflection windings.

2. In a television receiver, a deflection circuit according to claim 1 wherein said first transistor means comprises a first transistor having input and output terminals, a substantially constant current source coupled to said input terminal, and means for coupling said output terminal to said first capacitor.

3. In a television receiver, a deflection circuit according to claim 2 wherein said transistor further comprises a common terminal, said deflection circuit further comprising a substantially constant voltage source coupled to said common terminal.

4. In a television receiver, a deflection circuit according to claim 3 and further comprising
a voltage divider comprising second and third resistors coupled in series relation across said voltage source, and
means for coupling said input terminal to the junction of said second and third resistors.

5. In a television receiver, a deflection circuit according to claim 4 wherein
said second capacitor and said first resistor are coupled in series relation with each other, the series combination being coupled in parallel with said deflection windings,
said circuit further comprising means coupled between said transistor input terminal and the junction of said first resistor and second capacitor for modifying the constant current supplied to said input terminal to compensate for circuit non-linearities.

6. In a television receiver, a deflection circuit according to claim 1 and further comprising
means for providing a voltage waveform representative of the current through said deflection windings,
integrating means for modifying said voltage waveform,
a transistor current source,
means for coupling said modified voltage waveform from said integrating means to said transistor current source, and
means for coupling said transistor current source to said first transistor means to provide S-correction of said first capacitor voltage.

7. In a television receiver, a deflection circuit according to claim 6 and further comprising a transformer for coupling said deflection windings to said amplifying means,
said means for providing a voltage waveform comprising a second resistor coupled in series relation with at least a portion of said transformer.

8. In a television receiver, a deflection circuit according to claim 7 wherein
said integrating means comprises the series combination of a third resistor and a third capacitor coupled across said second resistor.

9. In a television receiver, a deflection circuit according to claim 8 and further comprising
temperature sensitive biasing means coupled to said transistor current source for maintaining desired S-correction as ambient temperature varies.

10. In a television receiver, a deflection circuit according to claim 9 and further comprising
switching means coupled across said first capacitor and
periodically operable means for periodically rendering said switching means conductive to discharge said first capacitor.

11. In a television receiver, a deflection circuit according to claim 10 wherein
said periodically operable means comprises an oscillator stage coupled to said switching means to render said switching means conductive and further coupled to said first transistor means to render said first transistor means non-conductive.

References Cited

UNITED STATES PATENTS 2,964,673 12/1960 Stanley ______________ 315—27

RODNEY D. BENNETT, *Primary Examiner.*

JOSEPH G. BAXTER, *Assistant Examiner.*